United States Patent [19]
Maison

[11] 3,830,160
[45] Aug. 20, 1974

[54] TURNTABLE FOR TRACKLESS AIR BEARING VEHICLES

[75] Inventor: Richard L. Maison, San Diego, Calif.

[73] Assignee: Rohr Industries, Inc., Chula Vista, Calif.

[22] Filed: May 8, 1972

[21] Appl. No.: 251,400

[52] U.S. Cl. .............................................. 104/46
[51] Int. Cl. .............................................. B61j 1/00
[58] Field of Search ............. 104/35, 36, 37, 38, 39, 104/40, 41, 42, 43, 44, 45, 46, 47, 48, 49; 214/16.1 A

[56] References Cited
UNITED STATES PATENTS

| | | | |
|---|---|---|---|
| 1,261,681 | 4/1918 | Barnett | 214/85 |
| 1,449,767 | 3/1923 | MacLean | 104/44 |
| 1,556,294 | 10/1925 | Meehan | 214/38 BB |
| 1,925,442 | 9/1933 | Fournier | 214/16.1 A |
| 2,849,127 | 8/1958 | Densmore | 214/16.1 CE |
| 3,255,711 | 6/1966 | Kiraly | 104/44 |

*Primary Examiner*—Robert J. Spar
*Assistant Examiner*—Lawrence J. Oresky

[57] ABSTRACT

A turntable for vehicles provided with a pair of vehicle guideway sections. A hollow center post is positioned on a support surface intermediate the sections, and provided with two bearings, each of the bearings being connected to one of the sections, thus allowing each section to move along and around the post independently of the other. The sections are secured to each other by spring dampeners which limit such independent movement but allow the sections to move as a unit. Each of the sections is provided with a plurality of air bearings on its underside which allow the section to rise on a film of air when the bearings are supplied with air under pressure whereby one section, if loaded with a vehicle, will not transmit bending or twisting movements into the other unloaded section. A motor and wheel assembly is secured to one of the sections for rotating the turntable about the center post to selected positions opposite other guideway portions. Indexing toothed wedges are provided on the bottom sides of the sections which mate with similar toothed wedges positioned on the support surface when the sections are lowered to ensure perfect alignment of the sections with the other vehicle guideway portions so that vehicles can move on and off the turntable from and to the other portions as desired. Additionally provided is apparatus on the motor and wheel assembly which, when actuated, increases traction between the wheel and the support surface thus facilitating movement of the turntable.

13 Claims, 14 Drawing Figures

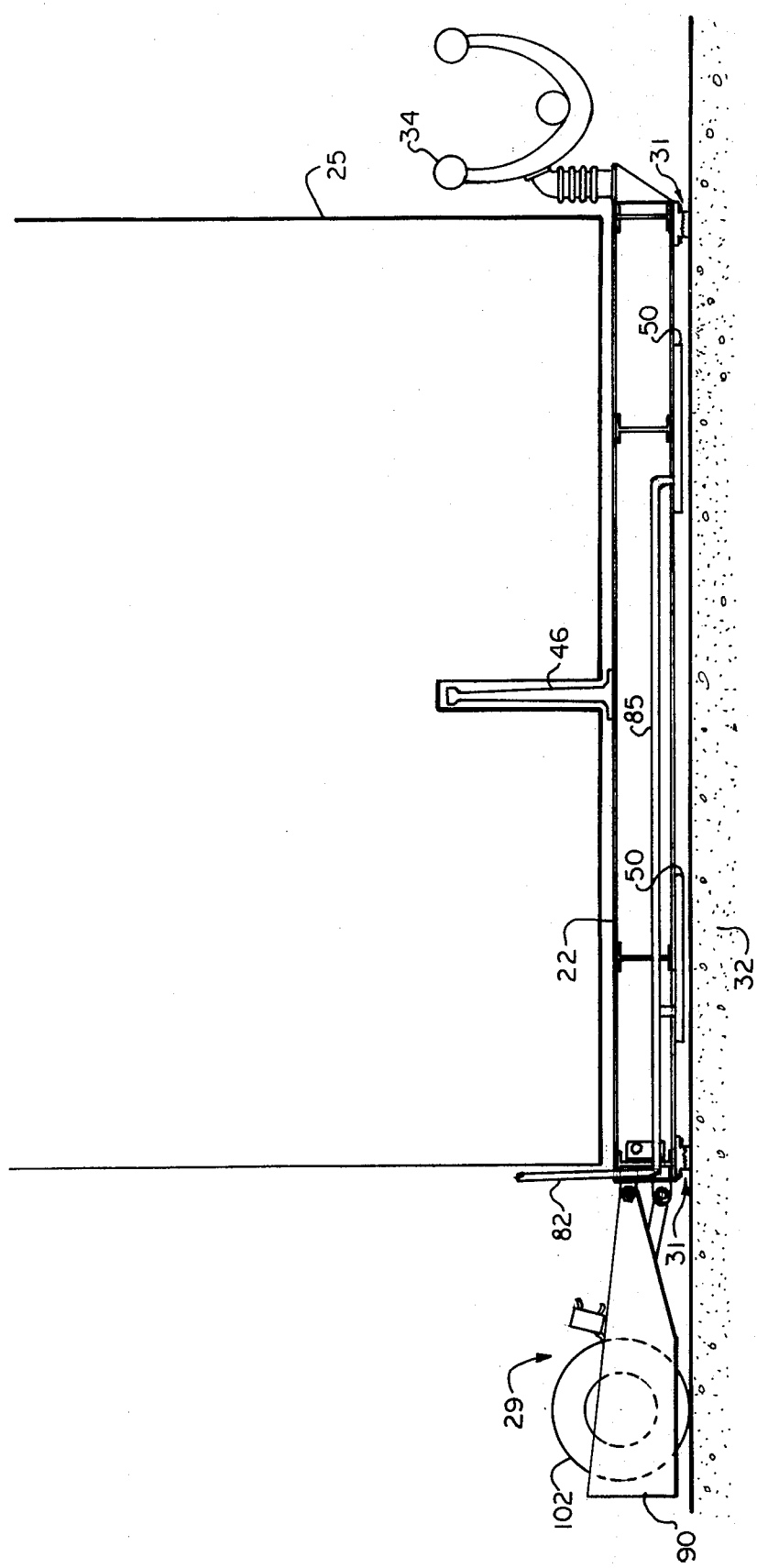

TURNTABLE FOR TRACKLESS AIR BEARING VEHICLES

BACKGROUND OF THE INVENTION

It is desired that there be provided apparatus for trackless air bearing vehicles whereby the vehicles can be switched, stored, or passed through the station at will. Such apparatus would include a turntable assembly having guideway sections which would be capable of being positioned for through station travel in one instance. Additionally, the vehicles could be moved onto the turntable and rotated up to 360° to exit to one of a plurality of storage positions on adjacent guideway portions, or to exit in many directions onto still other guideways. Moreover, such a turntable assembly could be provided for in an end house, when desired, wherein all exits and entrances are closed, with the exception of one. Such apparatus is provided for by the present invention.

SUMMARY OF THE INVENTION

A turntable for vehicles wherein there is provided vehicle guideway means having a plurality of guideway sections, and means which mounts the sections on a support for independent movement thereof about and along an axis.

BRIEF DESCRIPTION OF THE DRAWINGS

FIG. 3 is a cross sectional view of a portion of the apparatus of FIG. 1 along the lines 3—3;

DESCRIPTION OF THE PREFERRED EMBODIMENTS

Figure 1:
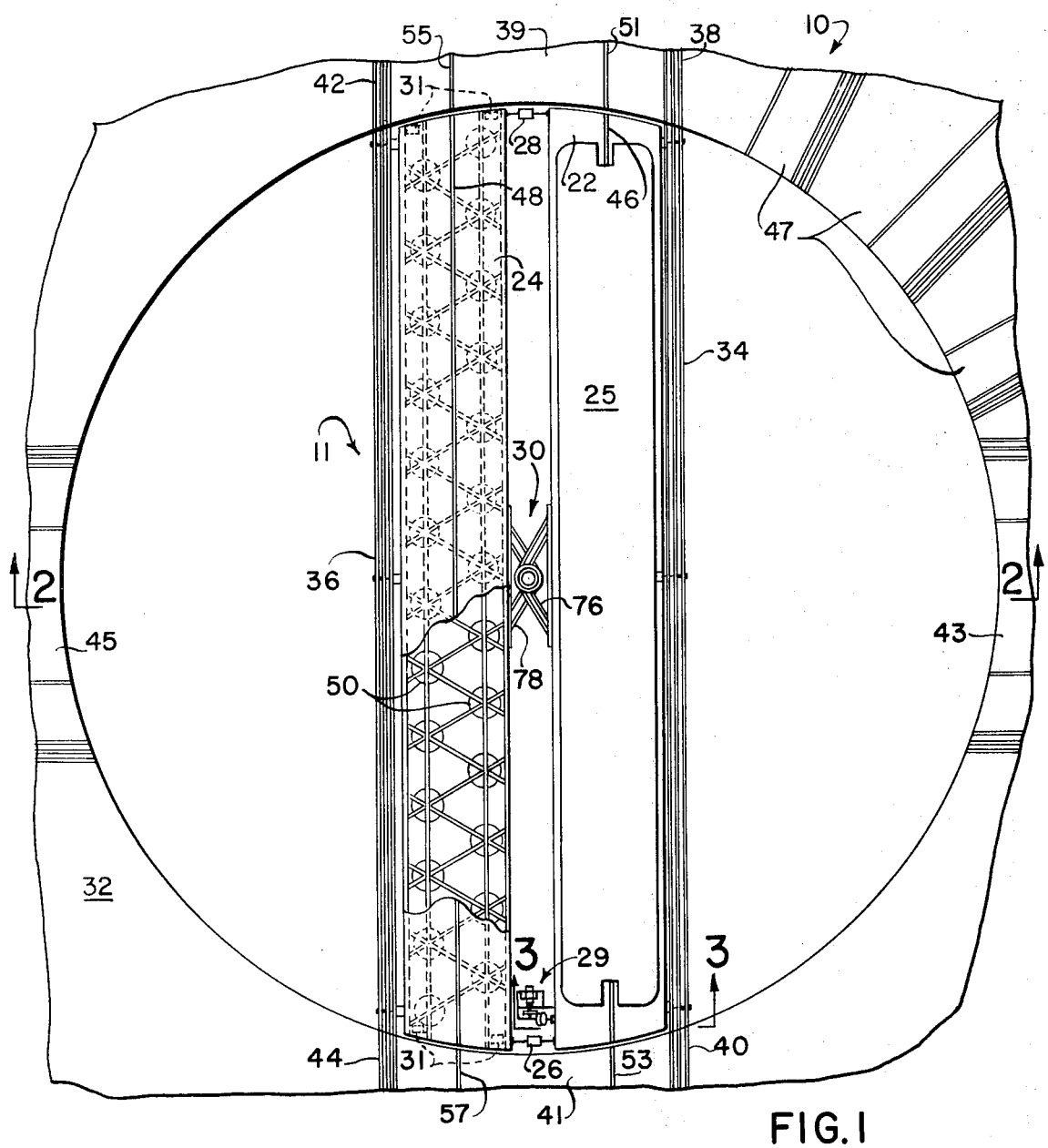
FIG. 1 is a plan view showing of the turntable apparatus of the present invention.
Figure 2:
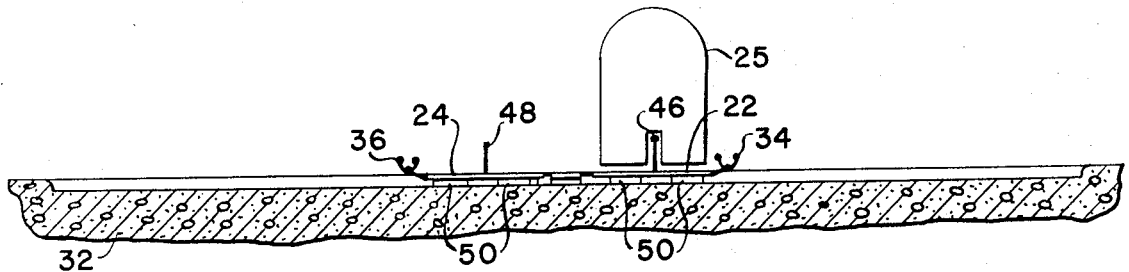
FIG. 2 is a cross sectional view of a portion of the apparatus of FIG. 1 taken along the lines 2—2.

FIGS. 1, 2, and 3 show the turntable assembly 10 of the present invention as generally consisting of a turntable 11, drive apparatus 29, pivot assembly 30, and a plurality of indexing assemblies 31 for aligning the turntable 11.

The turntable assembly 11 is provided with a pair of vehicle guideway sections 22 and 24, the section 22 being shown supporting a vehicle 25. The guideway sections 22 and 24 are secured to each other at their respective ends as by similar spring dampeners 26 and 28 for rotation by the drive apparatus 29 as a single unit about the pivot assembly 30 positioned in the concrete support 32 with limited relative rotational and up and down movement as will hereafter be more clearly apparent. Power collection rails 34 and 36 are carried by the respective sections 22 and 24, the rail 34 being capable of aligning with power collection rails 38 and 40 of main guideway portions 39 and 41, respectively, and the rail 36 aligning with the rails 42 and 44 of the portions 39 and 41, respectively, by means of the aligning assemblies 31. The sections 22 and 24 are also provided along their upper surface centers with reaction rails 46 and 48, respectively. The rail 46 aligns with reaction rails 51 and 53 on the portions 39 and 41, respectively, while the rail 48 aligns with the rails 55 and 57, likewise by means of the assemblies 31. It will be appreciated that alignment of the reaction and power collection rails on the sections 22 and 24 can be similarly achieved with corresponding rails on other guideway portions such as 43 and 45, and similar storage portions 47. A plurality of similar rubber cushion air bearings 50 are mounted on the lower surfaces of the sections 22 and 24 and serve to lift the respective sections when inflated with air under pressure and to lower them when deflated, thus providing independent up and down movement of the sections along the pivot assembly 30.

Figure 4:
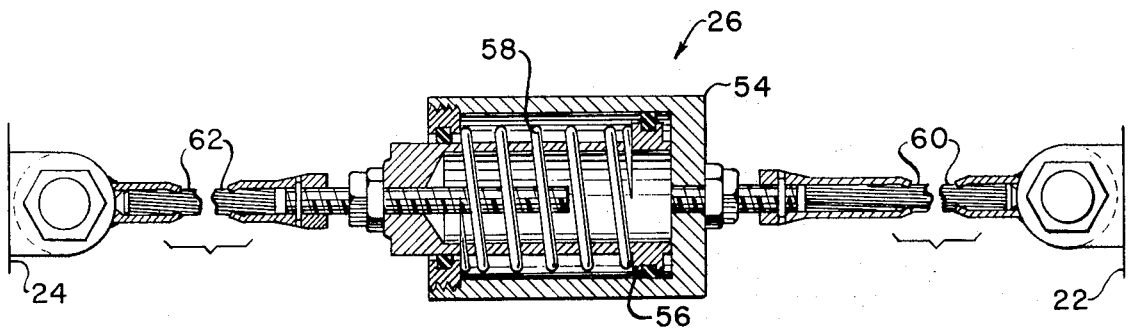
FIG. 4 is a cross sectional view showing the details of one of the dampener devices in the apparatus of FIG. 1.

Referring to FIG. 4, one of the dampeners 26 is shown as consisting of a cylindrical portion 54 and a piston 56 mounted for sliding movement therein against the restraint of a spring 58. The cylinder portion is suitably fastened to the section 22 as by means of a cable 60. The piston 54 is similarly fastened to the guideway section 24 as by cable 62. The dampener 28 is similarly constructed. It will be appreciated that the dampeners 26 and 28 serve to secure the ends of sections 22 and 24 together to provide rotation thereof as a unit, with limited relative movement therebetween. It will also be appreciated that the dampeners 26 and 28 tie the sections together as a rotating unit but do not override the indexing assemblies 31 alignment provision on turntable let-down.

Figure 5:
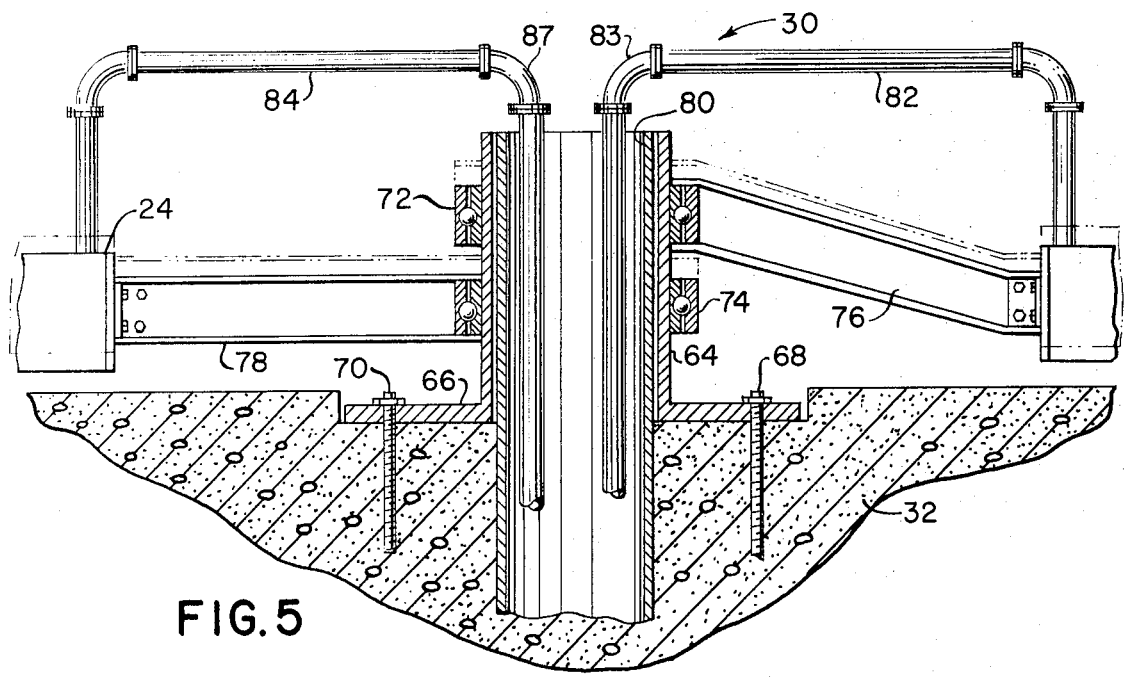
FIG. 5 is a cross sectional view of the pivot assembly of FIG. 1.

FIG. 5 shows in greater detail the pivot assembly 30 as consisting of an upright, hollow center post or cylindrical member 64 having an end flange portion 66 fastened to the concrete support 32 as by means of a plurality of bolts 68 and 70. A pair of bearing units 72 and 74 are positioned in tandem on the cylindrical member 64 for rotation and sliding up and down movement thereon. The bearing 72 is housed in beam member 76 which is secured to the section 22, while the bearing 74 is similarly housed and secured as by the beam 78 to the section 24. This allows each section to move up and down independently of the other when actuated. Also one section being loaded with a vehicle will not transmit bending or twisting moments to the unloaded section. A cylindrical conduit portion 80 is mounted in the concrete base 32 concentric with the member 64 and serves as a conduit for pipes swivelly connected at 83 and 87, and 82 and 84, conveying fluid under pressure from a source, not shown, through piping arrangements, such as 85, best shown in FIG. 3, to the air bearings 50 of the sections 22 and 24, respectively.

Figure 6:
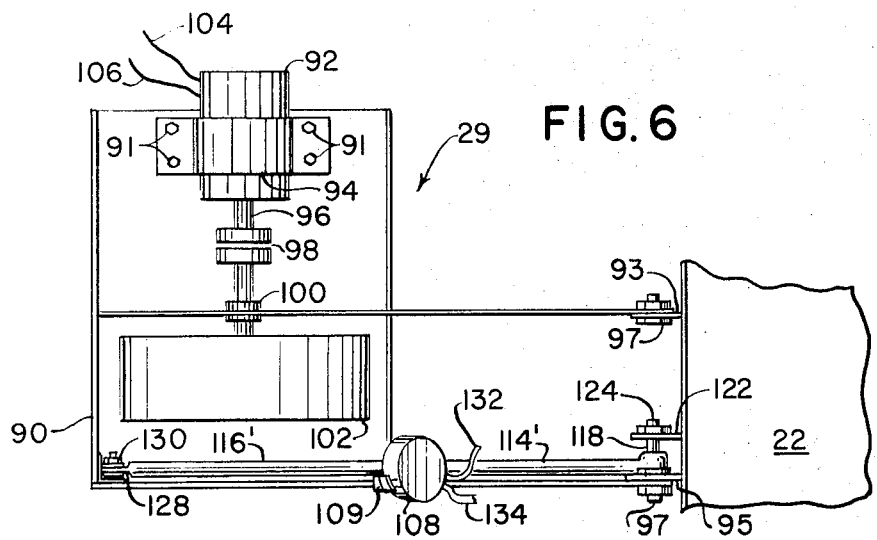
FIG. 6 is a plan view of the drive assembly of FIG. 1.
Figure 7:
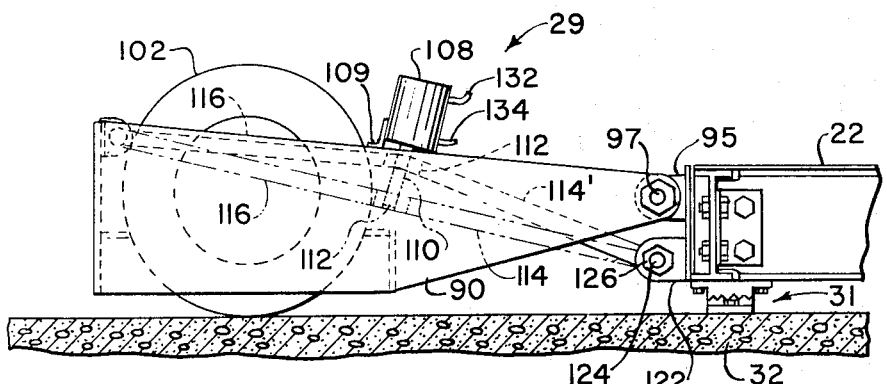
FIG. 7 is a side elevational view of the drive assembly of FIG. 6.

The drive apparatus 29, best shown in FIGS. 3, 6, and 7, consists of a metallic frame 90 carrying an electric motor 92 positioned thereon as by means of a strap 94 which is fastened to the frame, for example, as by bolt and nut arrangement 91, or by any other suitable means. The frame 90 is secured to the section 22 for up and down movement by means of a pair of flanges 93 and 95 provided on the section 22 and pivotally fastened thereto as by bolt and nut arrangements 97. The motor 92 has its shaft 96 connected through a flexible coupling 98 and gear assembly 100 to a wheel 102. A pair of electric wire conductors 104 and 106 may also lead from the motor, for example, through the conduit 80 to a remote control position, not shown, from which the electric motor may be actuated at will to operate in either direction of rotation to thus turn the wheel 102. A hydraulic power cylinder 108, which serves to force the drive wheel 102 hard against the surface support 32 during times of turntable operation, as will hereinafter be more fully explained, is mounted on the frame 90 as by a flange 109 and has its piston rod 110 end in pivotal engagement at 112 with tubular rods 114 and 116. The other end of rod 114 has a tubular end 118 adapted to be positioned between flanges 120 and 122 on the section 22 and secured thereto for pivotal movement as by bolt 124 passed through the tubular end 118 and flanges 120 and 122, and secured by nut 126. The other end of rod 116 is also secured to the frame 90 for pivotal movement as by a flange 128 and bolt and nut arrangement 130. A part of fluid pressure lines 132 and 134 can also lead back through the conduit 80 to the remote control position, not shown. It will be apparent that application of fluid pressure in the line 134 would serve to move the rods 114 and 116 to the indicated dashed line positions 114' and 116', thus causing the frame 90 to pivot in a direction about flange 95 and bolt and nut arrangement 97 to force the wheel 102 hard against the concrete support 32 to thus provide increased traction therebetween. Conversely, the application of fluid pressure in the line 132 provides for repositioning of the rods 114 and 116 to their original positions and a consequent relaxation of force by the wheel 102 against the concrete 32 and a diminution of traction therebetween.

Figure 8:
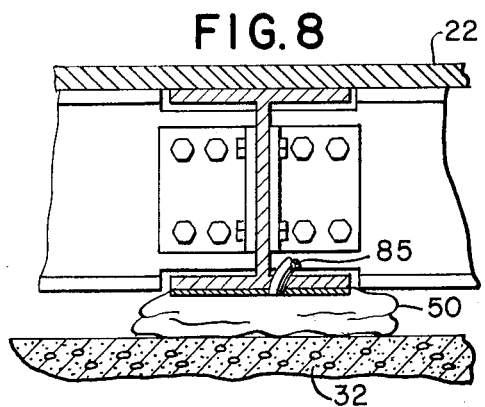
FIG. 8 is a side elevational view of a portion of the apparatus of FIG. 1 incorporating an air bearing shown in a deflated condition.
Figure 9:
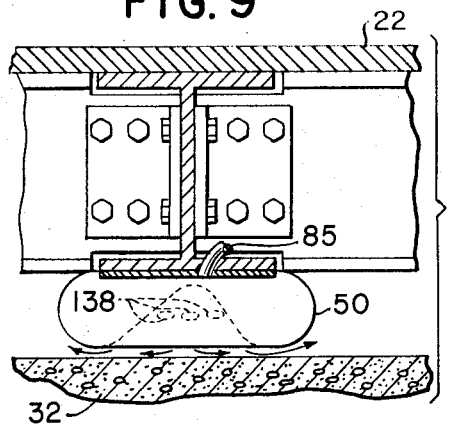
FIG. 9 is a side elevational view similar to that of FIG. 8 showing the air bearing in an inflated condition.

FIG. 8 shows one of the air bearings 50 in a deflated condition attached to the guideway portion 22, and adapted to recline air under pressure from the conduit 85. The air bearing 50 can be toroidal in shape and made of Neoprene-reinforced nylon fabric with air exit holes 138. Low pressure air introduced through the conduit 85 and out the holes 138 creates a thin air film under each bearing 50 which gently lifts the guideway 22, as shown in FIG. 9. It will be apparent that the guideway 24 is similarly lifted by the application of fluid pressure to its air bearings 50.

Figure 10:
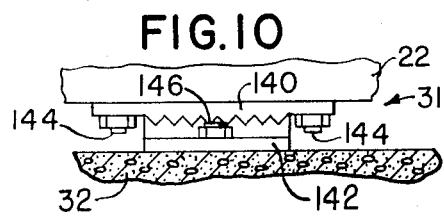
FIG. 10 is a side elevational view of one of the aligning devices of the present invention in engaged condition.
Figure 11:
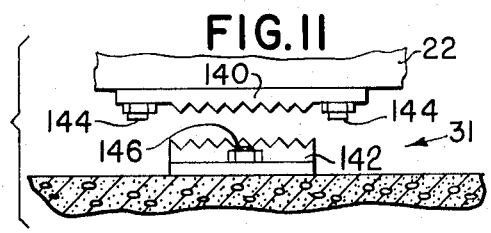
FIG. 11 is a side elevational view similar to that of FIG. 10 showing the aligning device in disengaged condition.
Figure 13:
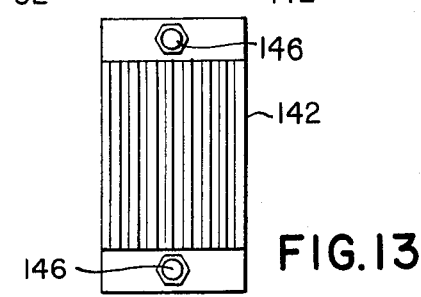
FIG. 13 is a plan view of the other component of the aligning device of FIGS. 10 and 11.
Figure 12:
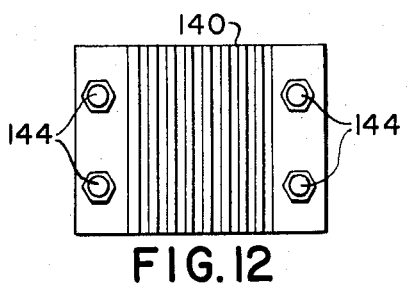
FIG. 12 is a plan view of one component of the aligning device of FIGS. 10 and 11.

FIGS. 10 and 11 show in greater detail one of the aligning assemblies 31 as being a pair of toothed indexing wedge elements 140 and 142, the element 140, FIG. 12, being secured to the section 22 by bolt fasteners 144, and the element 142, FIG. 13, to the support 32 by fasteners 146. It is to be understood that the section 24 also carries elements 140 similarly located thereon. As shown in FIG. 1, the indexing elements 142 are positioned to engage with the elements 140 so as to ensure accurate alignment of the reaction and power collection rails on the sections 22 and 24 with those on one pair of guideway portions 39 and 41. It will be appreciated that the elements 142 can be positioned at other locations on the support 32 to provide equally accurate alignments of the rails on sections 22 and 24, when the sections are rotated as a unit, with rails on other guideway portions, such as 43 and 45, as will herewith be more fully explained.

Figure 14:
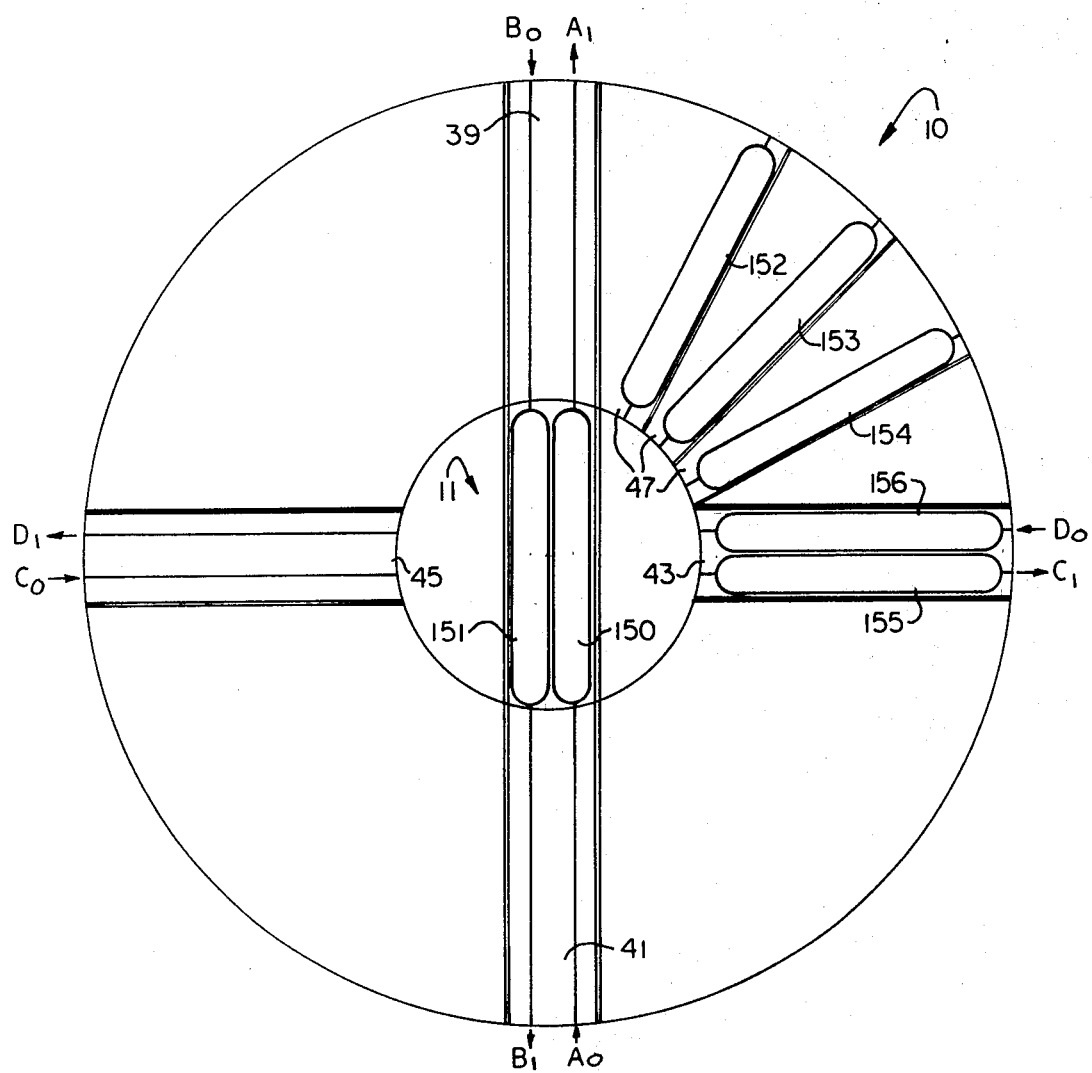
FIG. 14 is a plan view similar to that of FIG. 1 helpful in the understanding of the operation of the apparatus of the present invention.

Operation of the turntable apparatus 10 of the present invention can best be appreciated by referring to FIG. 14. With the turntable 11 positioned as shown in FIG. 14, through switch capability of a vehicle 150 can be achieved from the guideway portion 41 to the portion 39 along the route $A_0$–$A_1$. Similarly a vehicle such as that designated by the numeral 151 can pass from the guideway portion 39 to the portion 41 along the route $B_0$–$B_1$. Additionally, switch destinations can be achieved by the vehicles 150 and 151 as by the routes $A_0$–$C_1$, and $B_0$–$D_1$ by simply rotating the turntable 11 to align the section 22 and 24 with the guideway portions 43 and 45. This can be accomplished by first supplying pressurized air from the conduit 85 to the air bearings 50. Air flowing from the holes 138 in the bearings 50 serves to lift both the guideways 22 and 24 as a unit along the pivot assembly 30 such that the corresponding wedge elements 140 and 142 of the assemblies 31 become disengaged and the turntable prepared for rotation. As hereinbefore set forth, increased traction can now be provided between the wheel 102 and the support 32 by applying fluid under pressure to the cylinder 108 through the conduit 134 from the remote position, not shown. Application of electric power from the remote position through the wires 104 and 106 to the motor 92 serves to rotate the wheel 102 such that the turntable 11 moves in a clockwise direction, for example, to generally position the sections 22 and 24 in line with the guideway portions 43 and 45. Fluid pressure can now be applied in line 132 whereby the rods are repositioned to their original positions and traction by the wheel 102 against the surface 32 is now relaxed. The flow of air through the conduit 85 and the holes 138 is now stopped and the guideways 22 and 24 are allowed to settle, and guided as by hand, until the respective wedge elements 140 and 142 coincide to thus precisely align the guideways 22 and 24 with the portions 43 and 45.

It will be appreciated that additional switch destination can be provided the vehicles 150 and 151 as by the routes $A_0$–$D_1$, $B_0$–$C_1$, $C_0$–$A_1$, $C_0$–$A_1$, $C_0$–$B_1$, $D_0$–$A_1$, and $D_0$–$B_1$ by simply rotating the turntable 11 to align the sections 22 and 24 with the proper guideway portions 39, 41, 43, and 45.

Storage capability can be provided for twelve vehicles such as 152, 153, and 154 if the routes $A_0$–$A_1$, $B_0$–$B_1$, $C_0$–$C_1$, and $D_0$–$D_1$ are utilized and the turntable 11 is rotated to align with each of the storage sections 47 and other similar sections, not shown, located between the guideway portions 41 and 43, 41 and 45, and 39 and 45. If, however, it is desired to store sixteen vehicles, this can be accomplished by simply utilizing routes $A_0$–$A_1$ and $B_0$–$B_1$ and storing, in addition, such vehicles as 155 and 156 on the guideway 43 and a pair of other vehicles, not shown, on the guideway 45. Also it will be apparent that if the apparatus is used to provide round-house terminal capacity that eighteen vehicles can readily be accommodated.

It will be apparent that a turntable has been described which is well suited for use with trackless air bearing vehicles. Obviously many modifications and variations of this invention are possible in the light of the above teachings. It is, therefore, to be understood that within the scope of the appended claims the invention may be practiced otherwise than as specifically described.

I claim:

1. A turntable for vehicles comprising:
   a turntable having an axis for rotation,
   a vertically extending pivot assembly having a vertical axis,
   said turntable being mounted on said pivot assembly with the axis of said turntable being coincident with the vertical axis of said pivot assembly,
   said turntable comprising a plurality of horizontally extending vehicle guideway sections each having its longitudinal axis laterally offset from the vertical axis of said pivot assembly,
   each one of said plurality of vehicle guideway sections being mounted for movement about and along the vertical axis of said pivot assembly independent of the movement of any of the other vehicle guideway sections about and along the vertical axis of said pivot assembly, and
   wherein each one of said plurality of said guideway sections is capable of movement independent of any of the other vehicle guideway sections about the vertical axis of said pivot assembly when all of said guideway sections lie in the same horizontal plane.

2. The turntable of claim 1 further comprising means securing said vehicle guideway sections for limiting the independent movement of said sections about and along the axis of said pivot assembly.

3. The turntable of claim 2 wherein said securing means comprises spring dampener means.

4. The turntable of claim 1 further comprising means secured to said vehicle guideway sections for moving said sections along the axis of said pivot assembly.

5. The turntable of claim 4 wherein said moving means comprises:
   a plurality of air bearings secured to each of said vehicle guideway sections.

6. The turntable of claim 1 further comprising means secured to said vehicle guideway sections for rotating said sections about said axis of said pivot assembly.

7. The turntable of claim 6 wherein said rotation means comprises:
   a frame pivotally connected to one of said vehicle guideway sections;
   wheel means supporting said frame for movement about the axis when rotated; and
   motor means carried by said frame and connected to said wheel means for rotating said wheel means.

8. The turntable of claim 7 further comprising means connected to said frame and one section for pivoting said frame in a direction to regulate traction between said wheel and the support.

9. The turntable of claim 8 wherein said connections means comprises:
   a plurality of rods pivotally connected to each other and said frame and one section; and
   actuator means connected to said rods to rotate said frame in a direction to regulate traction between said wheel and the support.

10. The turntable of claim 1 further comprising means secured to said vehicle guideway means and a support surface vertically spaced beneath said vehicle guideway section for aligning said sections with other vehicle guideways in predetermined positions.

11. The turntable of claim 10 wherein said alignment means comprises:
    a first plurality of toothed indexing wedge elements carried by said vehicle guideway sections; and
    a second plurality of toothed indexing wedge elements adapted for positioning on the support surface space beneath the vehicle guideway section at the predetermined positions and for engagement with said first plurality of elements.

12. The turntable of claim 1 wherein said pivot assembly comprises:
    cylindrical means having a vertical axis mounted on a support surface; and
    a plurality of bearing members positioned in tandem on said cylindrical means, said bearing members each being attached to one of said vehicle guideway sections.

13. A turntable for vehicles comprising:
    a pair of vehicle guideway sections,
    an upright member positioned on a support intermediate said sections;
    a pair of bearings mounted in tandem on said upright member, each of said bearings being secured to one of said sections;
    means securing said sections for limited independent movement of said sections about and along said upright member;
    means secured to said sections for moving said sections along said upright member;
    means secured to said sections for rotating said sections about said upright member; and
    means secured to said sections and the support for aligning said sections with other vehicle guideways in predetermined positions.

* * * * *